Sept. 24, 1963  E. LUDLOW ETAL  3,104,735
SOUND ATTENUATING GAS PIPE
Filed Nov. 14, 1960  4 Sheets-Sheet 2
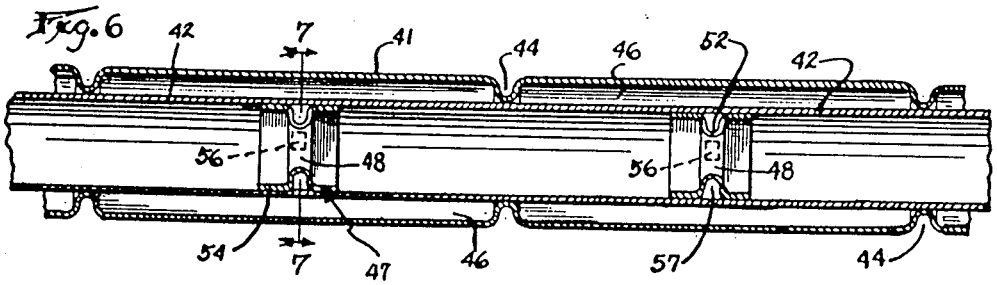
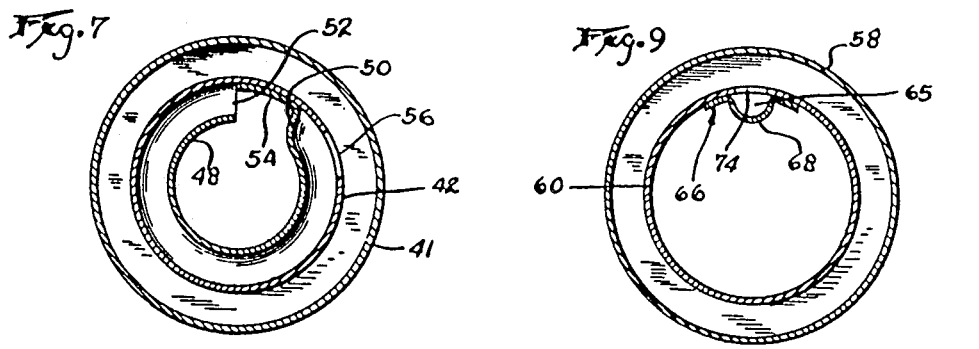
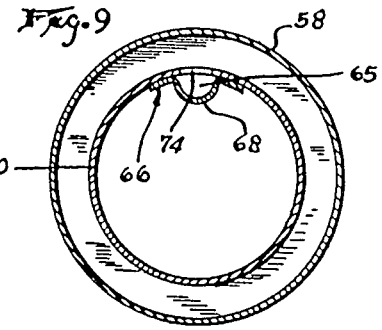
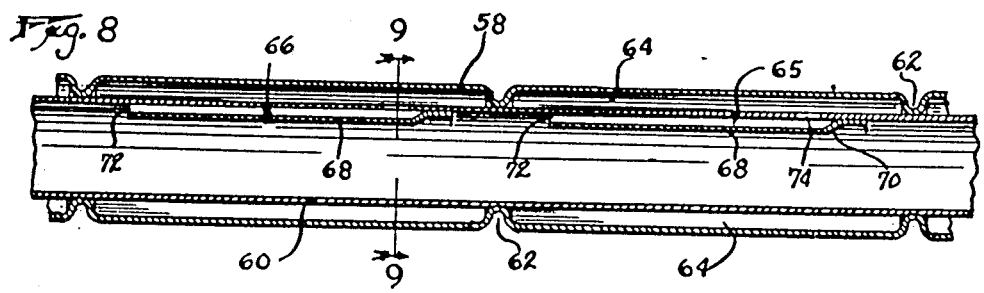
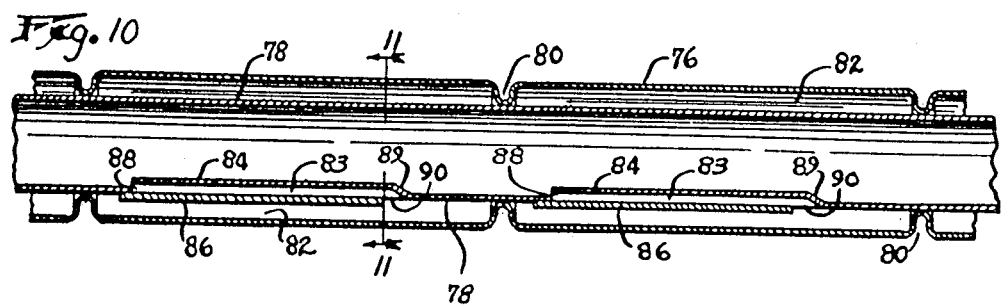
INVENTORS.
EDMUND LUDLOW AND
BY BENJAMIN H. IRWIN
Schley, Trask & Jenkins
ATTORNEYS.

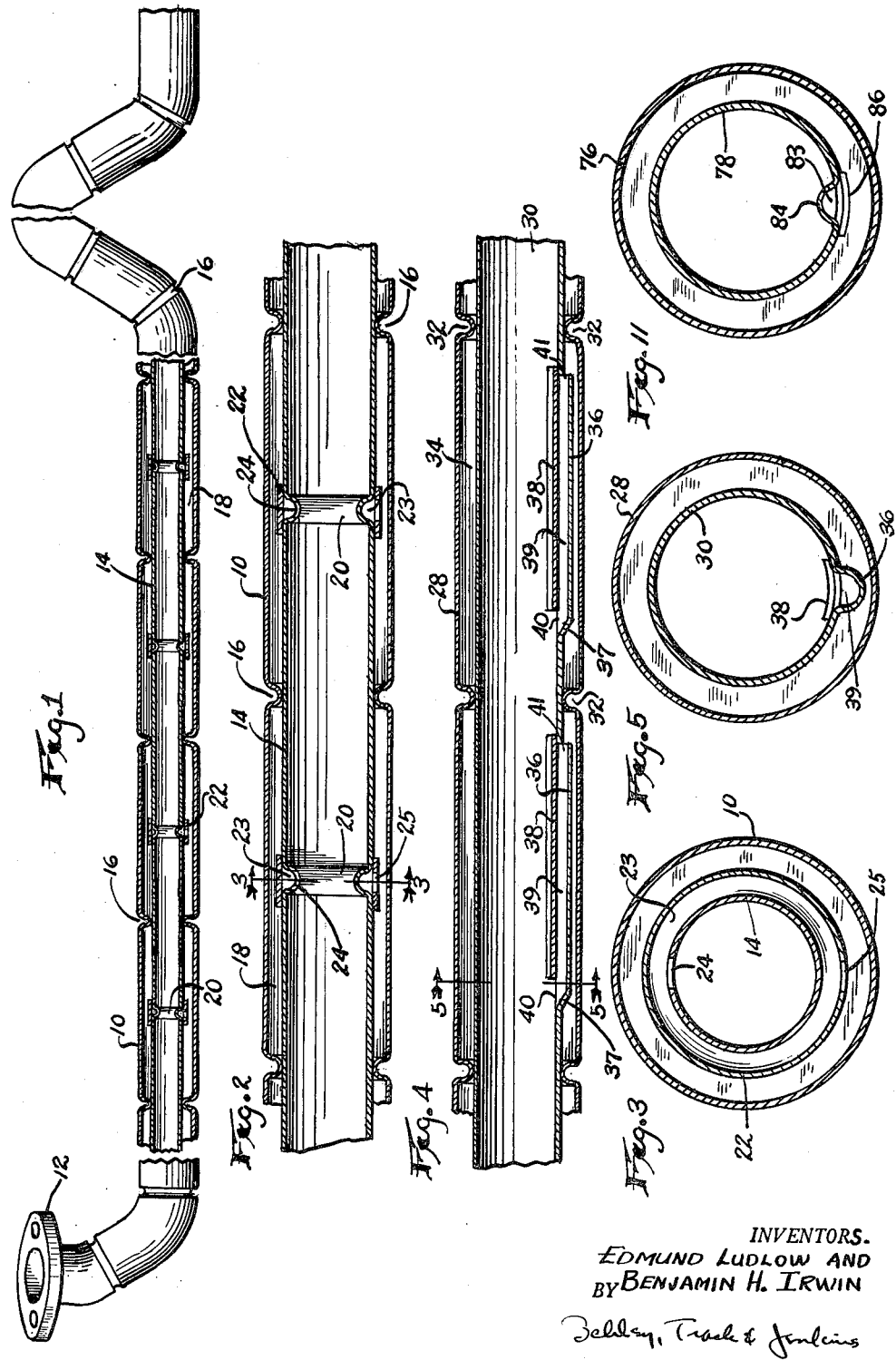

Sept. 24, 1963  E. LUDLOW ETAL  3,104,735
SOUND ATTENUATING GAS PIPE
Filed Nov. 14, 1960  4 Sheets-Sheet 3
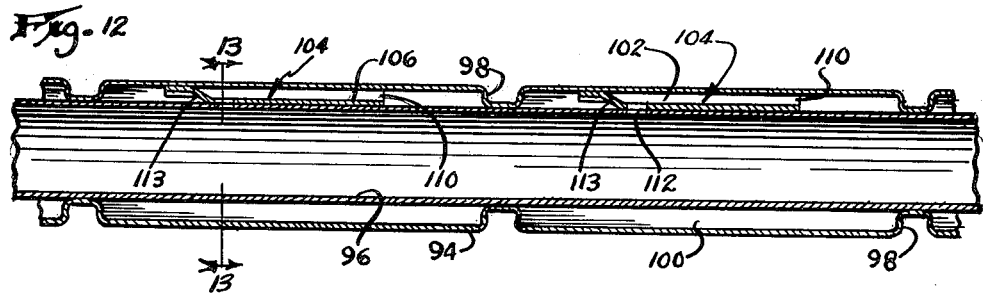
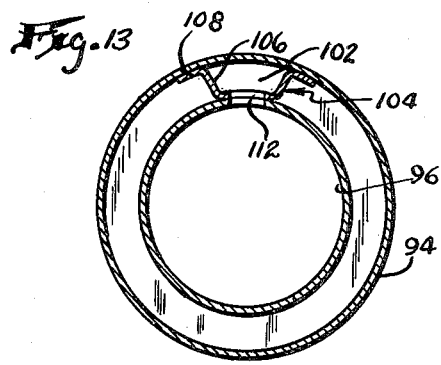
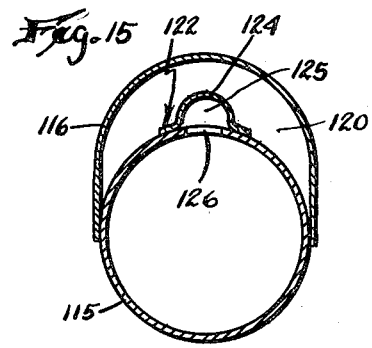
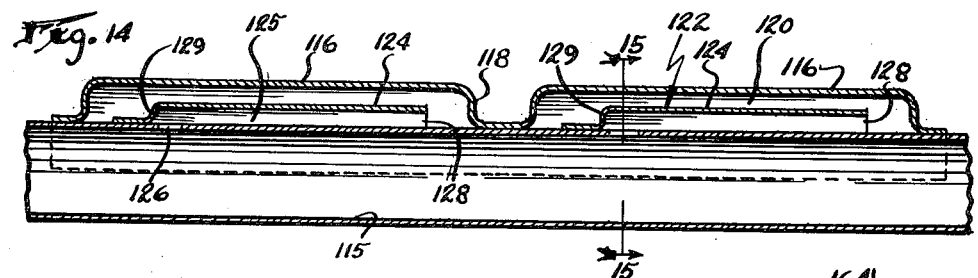
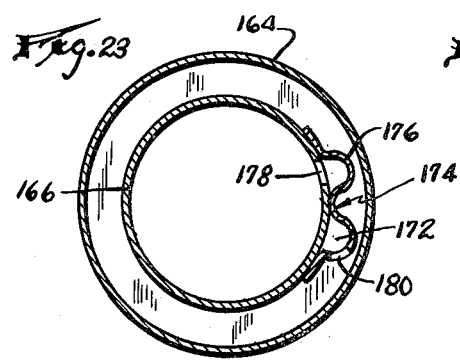
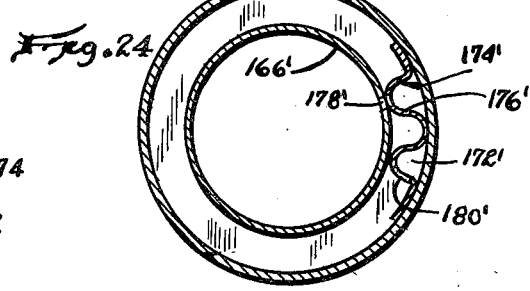
INVENTORS.
EDMUND LUDLOW AND
BENJAMIN H. IRWIN
BY
ATTORNEYS.

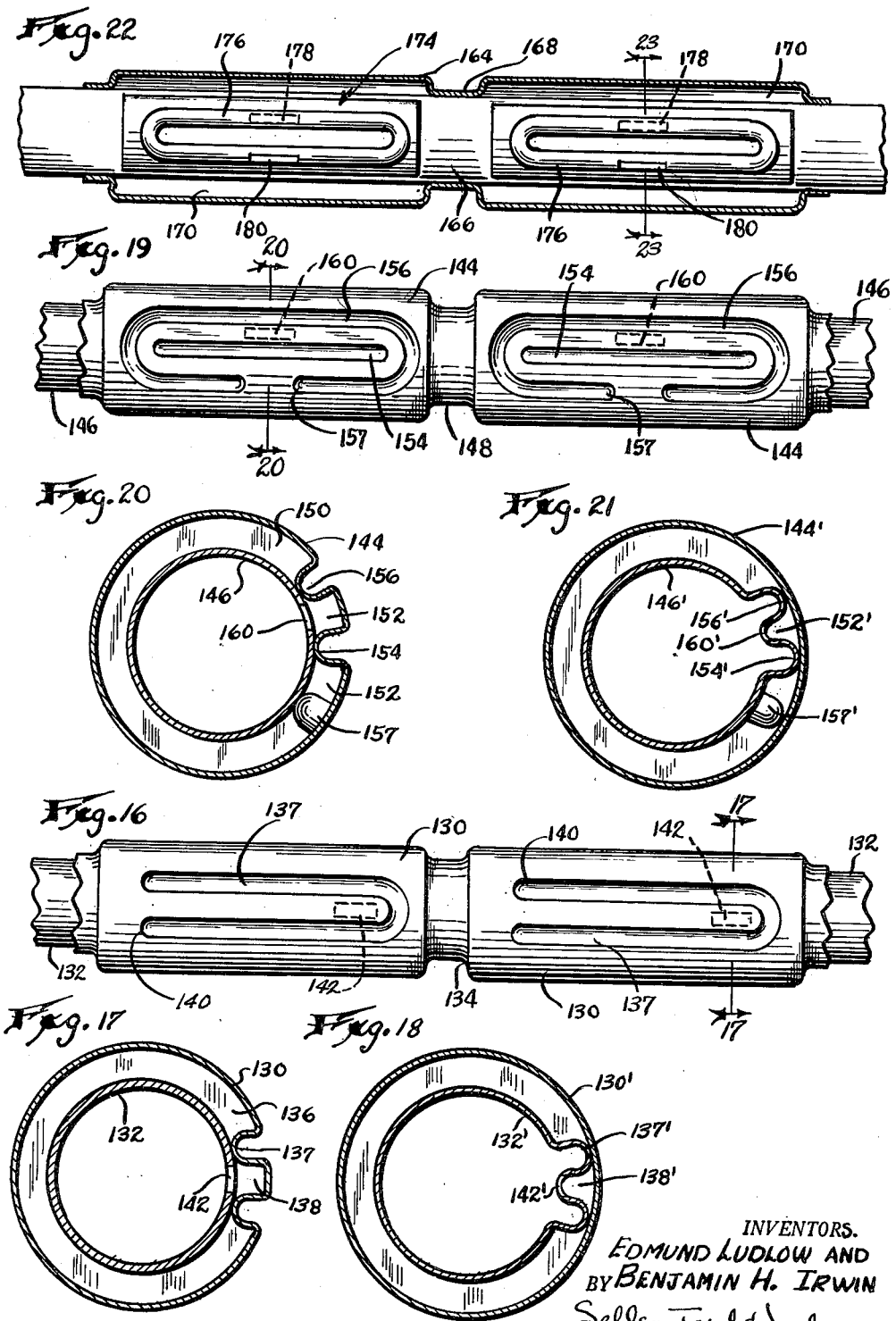

United States Patent Office 3,104,735
Patented Sept. 24, 1963

3,104,735
SOUND ATTENUATING GAS PIPE
Edmund Ludlow and Benjamin H. Irwin, Columbus, Ind., assignors to Arvin Industries, Inc., Columbus, Ind., a corporation of Indiana
Filed Nov. 14, 1960, Ser. No. 69,129
24 Claims. (Cl. 181—48)

This invention relates to a sound attenuating pipe, and more particularly to a sound attenuating exhaust pipe for use in association with internal combustion engines for conveying the exhaust gases therefrom and for attenuating the noise level of said exhaust gases.

It is an object of our invention to provide a sound attenuating pipe which will convey the exhaust gases eminating from an internal combustion engine, which will attenuate the noise level of such exhaust gases, and which will effect such sound attenuation over a wide range of frequencies. It is a further object of our invention to provide a pipe having such sound attenuating properties which can be easily and economically manufactured from metal-tubing, which will have limited space requirements, and which will provide an effective thermal insulation for hot exhaust gases.

In accordance with one form of our invention, there is provided an outer pipe having a plurality of axially spaced beads which abut and support an inner pipe in spaced relation to the outer pipe, said inner pipe defining a main gas-flow passage throughout its axial extent within said outer pipe. Said beads abut the inner pipe around its circumference and thus form the end walls of a plurality of axially spaced resonator volumes, the side walls of which are formed by the adjacent walls of the inner and outer pipes.

A plurality of elongated channels are disposed along the inner pipe in axial alignment with said resonator volumes and cooperate with the portion of the inner pipe in alignment therewith to form throats interconnecting each of the volumes and the main gas-flow passage. Each of said throats has one of its ends opening into one of said volumes and its opposite end opening into the main gas-flow passage of the inner pipe to thus place the several resonator volumes in operative communication with said passage for attenuating the noise level of the gases passing therethrough. Desirably, the throats and volumes have a plurality of different lengths and capacities, respectively, for attenuating a wide range of sound wave frequencies.

Other objects and features of our invention will become apparent from the more detailed description which follows and from the accompanying drawings, in which:

FIG. 1 is an isometric view partially in section showing a gas pipe embodying our invention;

FIG. 2 is an enlarged fragmentary longitudinal section of the gas pipe shown in FIG. 1;

FIG. 3 is an enlarged vertical section taken on the line 3—3 of FIG. 2;

FIG. 4 is a fragmentary longitudinal section of a modified form of our invention;

FIG. 5 is an enlarged vertical section taken on the line 5—5 of FIG. 4;

FIG. 6 is a fragmentary longitudinal section of another modified form of our invention;

FIG. 7 is an enlarged vertical section taken on the line 7—7 of FIG. 6;

FIG. 8 is a fragmentary longitudinal section of another modified form of our invention;

FIG. 9 is an enlarged vertical section taken on the line 9—9 of FIG. 8;

FIG. 10 is a fragmentary longitudinal section of another modified form of our invention;

FIG. 11 is an enlarged vertical section taken on the line 11—11 of FIG. 10;

FIG. 12 is a fragmentary longitudinal section of another modified form of our invention;

FIG. 13 is an enlarged vertical section taken on the line 13—13 of FIG. 12;

FIG. 14 is a fragmentary longitudinal section of another modified form of our invention;

FIG. 15 is an enlarged vertical section taken on the line 15—15 of FIG. 14;

FIG. 16 is a fragmentary side view of another modified form of our invention;

FIG. 17 is an enlarged vertical section taken on the line 17—17 of FIG. 16;

FIG. 18 is an enlarged vertical section similar to FIG. 17, but showing an alternative of the construction of FIG. 17;

FIG. 19 is a fragmentary side view of another modified form of our invention;

FIG. 20 is an enlarged vertical section taken on the line 20—20 of FIG. 19;

FIG. 21 is an enlarged vertical section similar to FIG. 20, but showing an alternative of the construction of FIG. 20;

FIG. 22 is a fragmentary side view of another modified form of our invention, but showing the outer pipe in section;

FIG. 23. is an enlarged vertical section taken on the line 23—23 of FIG. 22; and FIG. 24 is an enlarged vertical section similar to FIG. 23, but showing an alternative of the construction of FIG. 23.

In the operation of a conventional internal combustion engine in an automobile, the combustion of fuel within the cylinders produces a substantial volume of hot exhaust gases which are exhausted with substantial noise into one or more exhaust manifolds in communication with the exhaust ports of the several cylinders. The frequencies of the sound waves in such exhaust gases extend over a wide range, such as for example from about 30 cycles per second to about 5,000 cycles per second, and in many exhaust systems it is the lower range of frequencies, i.e., frequencies below 200 cycles per second, that are the most difficult to attenuate or silence. This low range of frequencies below 200 cycles per second is the most difficult to attenuate because the firing frequency of the engine falls within this range as does the natural resonance frequency of the exhaust system itself.

In a conventional automobile exhaust system all of the exhaust gas silencing occurs in a muffler having a relatively small number of resonator volumes with large capacities and arranged in staggered patterns to thus render said muffler bulky and difficult to mount on the underside of an automobile. In our invention, however, we eliminate such a muffler, and attenuate and silence the exhaust gases over a wide range of frequencies by passing them through a gas pipe having a plurality of in-line resonators disposed along the length of said pipe. These resonators may be tuned to attenuate different and overlapping bands of sound wave frequencies so that the combinative effect of all of the resonators is an attenuation of the entire range of frequencies of the sound waves in the exhaust gases. While our invention effects such an attenuation of the exhaust gas noises alone, if desired, it may also be used in combination with other air type resonator units such as other in-line resonator designs, a conventional muffler, or incorporated in a muffler as a component thereof, or used in combination with a sound absorbing acoustical liner.

As shown in FIG. 1, our invention comprises an outer pipe 10 adapted to be connected at one of its ends to an exhaust manifold by a conventional mounting flange 12. Conveniently, the pipe 10 may have the same outer diameter of about 2.25 inches as is normally used in the exhaust pipes and tail pipes in conventional exhaust systems.

Mounted within the outer pipe 10 is an inner pipe 14 forming the main gas-flow passage for the exhaust gases throughout its length in said outer pipe. A plurality of axially spaced, inwardly projecting beads 16 are formed in the outer pipe 10 and engage the inner pipe 14 around its entire circumference. In this manner, the beads 16 support the stretches of the inner pipe 14 therebetween in spaced relationship to the outer pipe 10, and each pair of said beads forms the end walls of a plurality of axially spaced resonator volumes 18 whose side walls are formed by the adjacent walls of the inner and outer pipes 14 and 10.

As shown in FIG. 2, a plurality of inwardly projecting circumferentially extending, beaded channels 20 are formed in the inner pipe 10 between each pair of the beads 16. A plurality of rings 22 are disposed around the inner pipe 14 to overlie the channels 20 and form therewith arcuate volume throats 23 which operatively interconnect each of the volumes 18 with the main gas-flow passage formed by the inner pipe 14. The ends of each of the throats 23 are formed by an opening 24 formed in the inner pipe 14 within the axial extent of the channel 20 and by an opening 25 formed in the ring 22. Since the sound waves are free to move both clockwise and counterclockwise in the throat from the opening 24 to the opening 25, each channel 20 and ring 22 forms two throats. However, these two throats are in parallel and thus produce, in effect, a single throat 23 interconnecting one of the volumes 18 to the main gas-flow passage. As shown in FIG. 3, the openings 24 and 25 are disposed 180° from each other about the circumference of the inner pipe 14, and thus provide the throat formed by the channel and ring with a length equal to one-half the circumference of the inner pipe. If the ring 22 is oriented on the inner pipe 14 in a position such that it is less than 180° from the bead opening 24, the pair of throats formed will be of different lengths, and will produce, in effect, a single throat having an arcuate length shorter than the shorter arcuate distance between the ring opening 25 and the channel opening 24.

It is well established in resonator design that a volume in operative communication with a longer throat will attenuate a lower band of sound wave frequencies than will the same volume when it is in operative communication with a shorter throat. Thus, in the modification shown in FIG. 2, the resonator volumes 18 will attenuate the lowest bands of sound wave frequencies when the ring and bead openings 25 and 24, respectively, are disposed 180° apart as shown in FIG. 3. In order to tune the throat 23 to attenuate a higher range of sound wave frequencies it is merely necessary to rotate the ring 22 about the inner pipe 14 to shorten the arcuate distance between the ring opening 25 and the channel opening 24. Thus, the several resonators may be tuned to silence the entire range of sound wave frequencies including the difficult to silence frequencies below 200 cycles per second.

As will be apparent, the volumes 18 also serve as a thermal insulation for the exhaust gases passing through the pipe 14, and will further materially reduce the direct transmission of high frequency sound from the gas stream through the wall of the outer pipe 10.

In the modification illustrated in FIGS. 4 and 5, there is provided an outer pipe 28 having an inner pipe 30 disposed within it and constituting the main gas-flow passage throughout its length in said outer pipe. A plurality of axially spaced, inwardly projecting beads 32 are formed in the outer pipe 28 and engage the inner pipe 30 around its circumference to thus hold the stretches of the inner and outer pipes interposed between the beads 32 in spaced relation to each other. In this manner, the beads 32 also form the end walls of a plurality of axially spaced resonator volumes 34 interposed between the adjacent walls of the inner and outer pipes 30 and 28.

Interposed between each pair of the beads 32 is an axially extending beaded channel 36 formed in the inner pipe 30 and projecting outwardly from the plane thereof into one of the volumes 34. As shown in FIG. 5, an axially extending, arcuate strip 38 is mounted on the inner face of the inner pipe 30 along the edges of the channel 36 to thus overlie said channel substantially along its axial and arcuate extent and to form therewith an axially extending volume throat 39. As shown, one end of the channel 36 is closed as at 37, but extends axially beyond the strip 38 to thus open into the main gas-flow passage at 40, the opposite end of said channel opening into one of the resonator volumes 34 at 41, thereby placing said volume in operative communication with the main gas-flow passage for attenuating the noise level of the gases moving through the inner pipe 30. The channels 36 and strips 38 may have any desired length so that the volumes 34 in operative communication therewith will attenuate the desired sound wave frequencies. However, when the openings 40 and 41 are axially spaced farther apart, the throats 39 will be longer so that the volumes in communication therewith will act upon lower ranges of sound wave frequencies.

In the modification illustrated in FIGS. 6 and 7, there is provided an outer pipe 41 having an inner pipe 42 disposed within it and constituting the main gas-flow passage throughout its length in said outer pipe. A plurality of axially spaced, inwardly projecting beads 44 are formed in the outer pipe 41 and engage the inner pipe 42 around its circumference to thus hold the stretches of the inner and outer pipes interposed between the beads 44 in spaced relation to each other. In this manner, the beads 44 form the end walls of a plurality of axially spaced resonator volumes 46 interposed between the adjacent walls of the inner and outer pipes 42 and 41.

As shown, annular sheet-metal stamping 47 is mounted on the inner walls of the inner pipe 42 between each pair of beads 44. Each of the stampings 47 comprises an inwardly projecting, arcuate, beaded channel 48 having one of its ends closed as at 50 and its opposite end open as at 52. A pair of annular flanges 54 project axially outwardly from the channel 48 and abut the inner circumference of the inner pipe 42. Thus, the channel 48 acts in combination with the portion of the inner pipe 42 in alignment therewith to form an arcuate volume throat 57 for one of the resonator volumes 46. The ends of said throat are formed by the open end of the channel 48 and by an opening 56 formed in the inner pipe 42 in axial alignment with said channel to thus dispose its volume 46 in operative communication with the main gas-flow passage of the inner pipe 42. The length of the throats may be adjusted by adjusting the arcuate positioning of the open ends 52 of the channels 48 with respect to the openings 56 in the inner pipe. In the embodiment illustrated in FIG. 7, the inner pipe opening 56 is disposed adjacent the closed end 50 of the channel 48 so that the throat will have a length only slightly smaller than the inner circumference of the inner pipe 42. To decrease the throat length, it is merely necessary to rotate the stamping 47 counterclockwise with respect to the inner pipe opening 56, as viewed in FIG. 7, to thus dispose the openings 52 and 56 operatively closer together.

In the modification shown in FIGS. 8 and 9, there is provided an outer pipe 58 having an inner pipe 60 disposed within it and constituting the main gas-flow passage throughout its length in said outer pipe. A plurality of axially spaced, inwardly projecting beads 62 are formed in the outer pipe 58 and engage the inner pipe 60 around its circumference to hold the stretches of the inner and outer pipes interposed between the beads 62 in spaced relation to each other and form the end walls of a plurality of axially spaced resonator volumes 64 interposed between said inner and outer pipes 60 and 58.

As shown in FIGS. 8 and 9, an axially extending sheet-metal stamping 66 is mounted on the inner face of the inner pipe 60 between each adjacent pair of beads 62. Each of the stampings 66 is provided with an axially extending, outwardly open, beaded channel 68 having one of its ends closed as at 70 and its opposite end 72 opening into the main gas-flow passage of the inner pipe 60. The portion of the inner pipe 60 overlying each of the channels 68 cooperates therewith to thus form a plurality of axially extending throats 65 for the volumes 64. The inner pipe 60 is provided with an opening 74 in axial and radial alignment with each channel 68 so that said openings 74 in the inner pipe 60 and the open ends 72 of the channels thus place the several volumes 64 in operative communication with the main gas-flow passage of the inner pipe 60. In order for a volume 64 to attenuate a higher range of sound wave frequencies, it is merely necessary to dispose the channel and pipe openings 72 and 74 of its throat 65 closer together such as by moving the opening 74 to the left as shown in FIG. 8 or by shortening the length of the insert 66.

In the modification illustrated in FIGS. 10 and 11, there is provided an outer pipe 76 having an inner pipe 78 disposed within it and constituting the main gas-flow passage throughout its length in said outer pipe. A plurality of axially spaced, inwardly projecting beads 80 are formed in the outer pipe 76 and engage the inner pipe 78 around its circumference to thus hold the stretches of the inner and outer pipes interposed between the beads 80 in spaced relation to each other and form the end walls of a plurality of axially spaced resonator volumes 82 interposed between the inner and outer pipes 78 and 76.

A plurality of inwardly projecting, axially extending, beaded channels 84 are formed in the inner pipe 78 between the adjacent pairs of beads 80. The channels 84 open outwardly, and an axially extending arcuate strip 86 is mounted on the outer face of the inner pipe 78 along the edges of each of the channels to thus overlie said channels and form therewith a plurality of volume throats 83. The ends of each of the throats 83 are formed by an open end 88 in the channel 84 opening into the main gas-flow passage, and by the opposite closed end 89 of the channel 84 which projects axially outwardly beyond the end of the strip 86 to form an opening 90 opening into one of the volumes 82. In this manner, each of the resonator volumes 82 is disposed in operative communication with the main gas-flow passage of the inner pipe 78. As with the other modifications of our invention, the lengths of the throats 83 may be adjusted to effect an attenuation of the desired range of sound wave frequencies by adjusting the relative distances between the throat openings 88 and 90.

In the modification illustrated in FIGS. 12 and 13, there is provided an outer pipe 94 having an inner pipe 96 disposed within it and constituting the main gas-flow passage throughout its length in said outer pipe. A plurality of axially spaced, inwardly projecting beads 98 are formed in the outer pipe 94 and engage the inner pipe 96 around its circumference to thus hold the stretches of the inner and outer pipes interposed between the beads 98 in spaced relation to each other and form the end walls of a plurality of axially spaced resonator volumes 100 interposed between the inner and outer pipes 96 and 94.

A plurality of sheet-metal stampings 104 are mounted on the inner face of the outer pipe 94 between the adjacent pairs of beads 98. As shown in FIG. 13, each of the stampings 104 comprises an outwardly open channel 106 whose web is disposed in abutting engagement with the outer face of the inner pipe 96 and whose legs are provided with outturned flanges 108 secured to the inner face of the outer pipe 94. Thus, the stamping channels and the portions of the outer pipe wall in alignment therewith form a plurality of axially extending volume throats 102. The ends of each of the throats 102 are formed by aligned openings 112 formed in the inner pipe and web of the channel 106 and by the open end 110 of the channel, the opposite end 113 of said channel being closed. In this manner, the openings 110 and 112 in the throats 102 dispose the volumes 100 in operative communication with the main gas-flow passage of the inner pipe 96 for attenuating the noise level of the exhaust gases moving through said passage. As with the other modifications of our invention, the resonators formed by the throats 102 and volumes 100 may be tuned for attenuating either higher or lower bands of sound wave frequencies by moving the openings 112 and 110 closer together or farther apart respectively.

In the modification of our invention illustrated in FIGS. 14 and 15, there is provided an elongated pipe 115 forming the main gas-flow passage. An elongated arcuate pipe element 116 is mounted on the pipe 115 with its axially extending edges rigidly secured to the pipe 115 as by welding. The pipe element 116 has a plurality of axially spaced, inwardly projecting beads 118 which engage the pipe 115 about segments of its circumference and form the end walls of a plurality of resonator volumes 120 interposed between the adjacent walls of the pipe elements 120 interposed between the adjacent walls of the pipe element 118 and the inner pipe 115.

As shown in FIG. 15, an axially extending, arcuate stamping 122 is mounted on the outer face of the inner pipe 115 between each pair of beads 118. Each of the stampings 122 has an inwardly open, elongated, beaded channel 124 which cooperates with the portion of the inner pipe 115 underlying it to form an axially extending volume throat 125. The ends of each of the throats 125 are formed by an opening 126 formed in the inner pipe 115 in axial and radial alignment with the channel 124 and by the open end 128 of said channel, the opposite end 129 of said channel being closed. In this manner, each of the throats 125 disposes one of the volumes 120 in operative communication with the main gas-flow passage of the inner pipe 115 for attenuating the noise level of the exhaust gases passing therethrough. Again, the resonators formed by the throats 125 and volumes 120 may be tuned to effect an attenuation of the desired range of sound wave frequencies by adjusting the axial spacing between the openings 126 and 128.

The gas pipe illustrated in FIGS. 14 and 15 may have alternative constructions in which the stampings are mounted on the inner face of the pipe 115, and/or in which an annular pipe is employed in place of the pipe element 116. In the latter instance, the pipe substituted for the pipe element 116 will necessarily have a larger diameter than the inner pipe 115 and will be eccentric to the inner pipe 115 so that circumferential segments of the walls of the two pipes will engage each other along their lengths.

In the modification illustrated in FIGS. 16–18, there is provided an outer pipe 130 having an inner pipe 132 disposed within it and constituting the main gas-flow passage throughout its length in said outer pipe. A plurality of axially spaced, inwardly projecting beads 134 are formed in the outer pipe 130 and engage the inner pipe 132 around its circumference to thus hold the stretches of the inner and outer pipes interposed between the beads 134 in spaced relation to each other and form the end walls of a plurality of axially spaced resonator volumes 136 interposed between said inner and outer pipes.

As shown in FIG. 17, an axially extending, generally U-shaped bead 137 is formed in the outer pipe 130 between each pair of adjacent beads 134. Each of the beads 137 projects inwardly to abut the outer face of the inner pipe 132 to form an axially extending channel cooperating with the portion of the inner pipe interposed between the stretches of the bead 137 to define a throat 138 for the resonator volume 136. The ends of said throat are formed by the open end 140 of the U-shaped bead 137 and by an opening 142 formed in the inner pipe 132 between the axially extending stretches of the bead 137. In this manner, each of the axially extending throats 138 disposes one of the volumes 136 in operative communication with the main gas-flow passage of the inner pipe 132 for attenuating the noise level of the gases passing therethrough.

An alternative arrangement is illustrated in FIG. 18 in which the throat-forming beads are formed on the inner pipe. As shown, an outer pipe 130' has an inner pipe 132' disposed within it, and said inner pipe is provided with axially spaced, elongated, generally U-shaped beads 137' which project outwardly from the pipe 132' to engage the inner face of the outer pipe 130' within the axial extent of the resonator volumes. In this manner, each of the beads 137' forms with the overlying portion of the outer pipe 130' an elongated volume throat 138', the ends of which constitute the open end of the U-shaped configuration of the bead 137' and an opening 142' formed in the inner pipe between the axially extending stretches of said bead 137'.

In the modification illustrated in FIGS. 19–21 there is provided an outer pipe 144 having an inner pipe 146 disposed within it and constituting the main gas-flow passage throughout its length in said outer pipe. A plurality of axially spaced, inwardly projecting beads 148 are formed in the outer pipe 144 and engage the inner pipe 146 around its circumference to thus hold the stretches of the inner and outer pipes interposed between the beads 148 in spaced relation to each other and form the end walls of a plurality of axially spaced resonator volumes 150 interposed between said inner and outer pipes 146.

As shown in FIG. 19, an axially extending, inwardly projecting bead 154 is formed in the outer pipe 144 between each pair of adjacent beads 148. A second inwardly projecting bead 156 having a generally C-shaped configuration is also formed in the outer pipe 144 around each bead 154 and between each pair of adjacent beads 148. Each set of beads 154 and 156 abuts the outer wall of the inner pipe so that the channeled space between the inner and outer pipes located between the beads 154 and 156 forms an elongated volume throat 152. The ends of each throat are formed by the open end 157 of the bead 156 and an opening 160 formed in the inner pipe 146 between the beads 154 and 156 to thus dispose each of the volumes 150 in operative communication with the main gas-flow passage of the inner pipe 146 for attenuating the noise level of the gases moving therethrough.

The embodiment shown in FIG. 19 forms two throats in parallel for each volume 150, one throat extending from the opening 160 around each end of the centrally disposed bead 154 to the opening 157. The two throats being in parallel, however, act as a single throat having an effective length equal to a length shorter than the length of the shorter of the two parallel throats. With the openings 160 and 157 oriented as in FIG. 19, the two parallel throats formed by the beads 154 and 156 are equal in length, and thus the modification illustrated provides the maximum throat length possible for the length of beads illustrated.

An alternative arrangement is illustrated in FIG. 21 in which the throat-forming beads are formed on the inner pipe. As shown, the inner pipe 146' is disposed within the outer pipe 144' and is provided within the axial extent of each resonator volume with an axially spaced, elongated bead 154' projecting outwardly to engage the inner face of the outer pipe 144'. A generally C-shaped bead 156' is disposed around the bead 154', and projects outwardly from the inner pipe 146' to abut the inner face of the outer pipe so that the space between the beads 154' and 156' forms a volume throat 152'. The ends of said throat are formed by an opening 160' formed in the inner pipe between the beads 154' and 156' and the open end 157' of the C-shaped bead 156'. The throat formed by the structure shown in FIG. 21 operates in precisely the same manner as the throat structure illustrated in FIG. 20, and its effective length may be modified in the same manner as the throat illustrated in FIG. 20.

In the modification illustrated in FIGS. 22 and 23 there is provided an outer pipe 164 having an inner pipe 166 disposed within it and constituting the main gas-flow passage throughout its length in said outer pipe. A plurality of axially spaced, inwardly projecting beads 168 are formed in the outer pipe 164 and engage the inner pipe 166 around its circumference to thus hold the stretches of the inner and outer pipes interposed between the beads 168 in spaced relation to each other and form the end walls of a plurality of axially spaced resonator volumes 170 interposed between said inner and outer pipes.

As shown in FIG. 23, a sheet-metal stamping 174 is mounted on the outer face of the inner pipe 166 between each pair of adjacent beads 168. Each stamping 174 has an inwardly open, channeled bead 176 having an oval-like configuration with its longitudinal axis parallel to the longitudinal axes of the pipes 164 and 166. As shown, the channeled bead 176 cooperates with the portion of the inner pipe 166 lying thereunder to define a volume throat 172. The ends of each of the throats are formed by an opening 178 formed in the inner pipe 166 within the axial and lateral extent of the channeled bead 176 and by an opening 180 formed in said bead and opening into the adjacent resonator volume 170. In this manner, the channeled bead 176 and the openings 178 and 180 form a pair of elongated throats 172 in parallel with each other and acting as a single throat for disposing one of the volumes 170 in operative communication with the main gas-flow passage of the inner pipe 166. As previously described, the effective length of the throat 172 may be adjusted by the adjustment of the relative positions of the openings 178 and 180 so that the volume 170 will attenuate the desired range of sound wave frequencies.

In the alternative arrangement shown in FIG. 24, the stamping 174' is mounted on the inner face of the outer pipe 164' between said outer pipe and an inner pipe 166' constituting the main gas-flow passage. The stamping 174' has an outwardly open channeled bead 176' having a generally oval-like configuration with its longitudinal axis parallel to the longitudinal axes of the inner and outer pipes 166' and 164'. The bead 176' cooperates with the overlying portion of the outer pipe 164' to form a volume throat 172', the ends of which are formed by an opening 180' formed in the bead and by a pair of aligned openings 178' formed in the inner pipe 166' and the web of said bead abutting said inner pipe. Again, the effective length of the throat 172' may be adjusted by adjusting the relative positions of the openings 178' and 180' with respect to each other.

Although we have described all of the beads forming the ends walls of the resonators as being formed in the outer pipe and projecting inwardly to engage the inner pipe about its circumference, it is to be understood that the end walls of said resonators may also be formed by outwardly projecting beads formed in the inner pipe and engaging the inner walls of the outer pipe about its circumference. It is, of course, also possible to vary the axial spacing of the beads forming the resonator end walls to vary the capacities of the resonator volumes for tuning said volumes to the desired frequencies.

When our invention is not used as the sole means for silencing the exhaust gases of an engine, such as for example when it is used in combination with other in-line resonators, or in combination with a conventional muffler, or as a component of a muffler, short sections of the pipes containing our in-line resonators are produced. These short sections may be employed as sections of the exhaust pipes interconnecting the manifolds and mufflers, or used as components of conventional mufflers, in which case they are merely mounted within the muffler shells.

For purposes of simplicity of description, we have only described our invention for use in an exhaust system. However, it may, of course, also be used on the intake side of an internal combustion engine for transporting and silencing the gaseous mixtures into the engine, or for any other applications involving movement and silencing of gases.

We claim as our invention:

1. In a sound attenuating gas pipe for conveying and attenuating the noise level of a moving gas stream, an elongated inner wall having a generally circular cross-section and forming a substantially uninterrupted main gas-flow passage, an elongated outer wall disposed outside said inner wall, means axially spaced along at least one of said walls engaging the other wall to maintain the portions of the inner and outer walls interposed between said means in spaced relation to each other and to form the end walls of a plurality of axially spaced resonator volumes interposed between said inner and outer walls, and means on one of said walls extending out of the plane thereof between each pair of said first means and acting in combination with the portion of one of the walls in alignment therewith to form an elongated open-ended volume throat operatively interconnecting each of said volumes with said main gas-flow passage for attenuating the noise level of the gases moving through said passage.

2. In a sound attenuating gas pipe for conveying and attenuating the noise level of a moving gas stream, an outer pipe, an inner pipe carried within said outer pipe and providing a main gas-flow passage throughout its length in said outer pipe, means axially spaced along at least one of said pipes and extending circumferentially therearound to abut the adjacent wall of the other pipe to hold the stretches of the pipes between said means in spaced relation to each other and to form the end walls of a plurality of axially spaced resonator volumes interposed between the adjacent walls of the pipes, and means on the walls of one of said pipes between each pair of said first mentioned means and acting in combination with the portions of one of the pipe walls in alignment therewith to form an elongated open-ended volume throat operatively interconnecting each of said volumes with said main gas-flow passage for attenuating the noise level of the gases moving through said passage.

3. The invention as set forth in claim 2 in which said first mentioned means comprises a plurality of axially spaced beads formed in one of the pipes whereby each adjacent pair of said beads forms the end walls of one of said volumes.

4. The invention as set forth in claim 2 in which said second mentioned means comprises a sheet-metal stamping mounted on said inner pipe and provided with an elongated channel having its open side presented toward said inner pipe whereby said channel and the portion of the inner pipe in alignment therewith form an elongated volume throat, the ends of said throat being formed by openings formed in said channel and said portion of the inner pipe.

5. The invention as set forth in claim 2 in which said second mentioned means comprises a sheet-metal stamping mounted on said inner pipe, and the portion of the inner pipe in alignment with said stamping comprises an elongated beaded channel acting in combination with said stamping to form an elongated volume throat, said throat having openings at each of its ends whereby said throat operatively interconnects said main gas-flow passage with one of the resonator volumes.

6. The invention as set forth in claim 2 in which said second mentioned means comprises an elongated channel formed by at least one bead projecting radially away from one of said pipes and abutting the other of said pipes, said channel and the wall of the other pipe in alignment therewith forming an elongated volume throat interposed between the adjacent faces of the inner and outer pipes, the ends of said throat being formed by openings formed in said channel and the inner pipe within the axial and radial extent of said channel.

7. The invention as set forth in claim 4 in which said stamping is mounted on the inner face of the inner pipe and said channel projects axially and inwardly from said inner pipe into said main gas-flow passage, and said openings in the channel and inner pipe comprise, respectively, an end of the channel opening into said passage and an opening formed in said inner pipe within the axial and radial extent of said channel.

8. The invention as set forth in claim 4 in which said stamping is mounted on the outer face of the inner pipe and said channel projects axially and outwardly from said inner pipe into one of said volumes, and said openings in the channel and inner pipe comprise, respectively, an open end of the channel opening into said one of said volumes and an opening formed in said inner pipe within the axial and radial extent of said channel.

9. The invention as set forth in claim 4 in which said stamping is mounted on the inner face of said inner pipe and said channel has an arcuate configuration projecting inwardly into said main gas-flow passage, and said openings in the channel and inner pipe comprise, respectively, an open end of the channel opening into said passage and an opening formed in the inner pipe within the axial and radial extent of said channel.

10. The invention as set forth in claim 9 in which said stamping is rotatably adjustable with respect to said inner pipe for adjusting the arcuate spacing between said channel and inner pipe openings to adjust the length of the throat formed by said channel and inner pipe.

11. The invention as set forth in claim 4 in which said stamping is mounted on the outer face of said inner pipe and said channel comprises a continuous closed end bead formed in said stamping, and said openings in the channel and inner pipe comprise, respectively, an opening formed in said bead and opening into one of said volumes and an opening formed in said inner pipe within the axial and radial extent of said bead.

12. The invention as set forth in claim 5 in which said stamping comprises an axially extending strip mounted on the outer face of the inner pipe and said beaded channel projects inwardly of the general plane of the inner pipe into said main gas-flow passage, and said openings in the throat comprise the opposite ends of said channel opening into the gas-flow passage and said one of said volumes.

13. The invention as set forth in claim 5 in which said stamping comprises an axially extending strip mounted on the inner face of the inner pipe and said beaded channel projects outwardly from the general plane of the inner pipe into said one of said volumes, and said openings in the throat comprise the opposite ends of said channel opening into the gas-flow passage and said one of said volumes.

14. The invention as set forth in claim 5 in which said stamping comprises an annular ring mounted on the outer face of the inner pipe and said beaded channel has an arcuate configuration projecting inwardly from the general plane of the inner pipe into said main gas-flow passage, and said openings in the throat comprise openings formed in said channel and ring.

15. The invention as set forth in claim 14 in which said ring is rotatably adjustable with respect to said inner pipe for adjusting the arcuate spacing between said channel and ring openings to adjust the length of the throat formed by said beaded channel and inner pipe.

16. The invention as set forth in claim 6 in which said bead comprises a generally U-shaped bead configuration formed in said outer pipe and projecting inwardly from the general plane thereof to abut said inner pipe to form said channel, and said ends of said throat comprise the open end of the U-shaped configuration of the bead and an opening formed in the inner pipe within the axial and radial extent of said channel.

17. The invention as set forth in claim 6 in which said bead comprises a generally U-shaped bead configuration formed in said inner pipe and projecting outwardly from the general plane thereof to abut said outer pipe to form said channel, and said ends of said throat comprise the open end of the U-shaped configuration of the bead and an opening formed in the inner pipe within the axial and radial extent of said channel.

18. The invention as set forth in claim 6 in which said elongated channel is formed by a first elongated bead formed in said outer pipe and a second generally C-shaped bead formed in said outer pipe and disposed around said first bead, said first and second beads projecting inwardly out of the plane of said outer pipe to abut said inner pipe and form therewith said volume throat, and the ends of said throat comprise the open end of the C-shaped configuration of the second bead and an opening formed in the inner pipe between said first and second beads.

19. The invention as set forth in claim 6 in which said elongated channel is formed by a first elongated bead formed in said inner pipe and a second generally C-shaped bead formed in said inner pipe and disposed around said first bead, said first and second beads projecting outwardly out of the plane of said inner pipe to abut said outer pipe and form therewith said volume throat, and the ends of said throat comprise the open end of the C-shaped configuration of the second bead and an opening formed in the inner pipe between said first and second beads.

20. The invention as set forth in claim 6 in which said bead is a continuous closed end bead formed on a sheet-metal stamping abutting the opposed faces of said inner and outer pipes, and the ends of said throat comprise an opening formed in said bead and opening into said one of said resonator volumes and a pair of aligned openings formed in said inner pipe and the face of said bead abutting said inner pipe.

21. The invention as set forth in claim 6 in which said channel is formed by an axially extending bead formed in a sheet-metal stamping mounted on said outer pipe, said bead abutting the inner pipe to form an outwardly open channel acting in combination with the aligned portion of the outer pipe to form said volume throat, and the ends of said throat comprise an open end of said bead opening into one of said resonator volumes and a pair of aligned openings formed in said inner pipe and the face of the bead abutting said inner pipe.

22. The invention as set forth in claim 1 in which said second mentioned means comprises a sheet-metal stamping mounted on said inner wall and provided with an elongated axially extending channel having its open side presented toward said inner wall whereby said channel and the portion of the inner wall in alignment therewith form an elongated volume throat, the ends of said throat being formed by openings formed in said channel and said portion of the inner wall.

23. The invention as set forth in claim 1 in which said inner wall comprises an elongated inner pipe and said outer wall comprises an elongated outer pipe segment having its axially extending edges rigidly secured to said inner pipe.

24. The invention as set forth in claim 1 in which said inner and outer walls comprise elongated inner and outer pipes, said inner pipe being disposed eccentrically within said outer pipe and abutting said outer pipe along an axially extending segment of its circumference.

References Cited in the file of this patent

UNITED STATES PATENTS

| 1,975,861 | Oldberg | Oct. 9, 1934 |
| 2,099,858 | MacKenzie et al. | Nov. 23, 1937 |
| 2,188,202 | MacKenzie et al. | Jan. 23, 1940 |
| 2,297,046 | Borne | Sept. 29, 1942 |
| 2,357,792 | Powers | Sept. 5, 1944 |
| 2,632,521 | Eaton | Mar. 24, 1953 |
| 2,643,731 | Schmid | June 30, 1953 |

FOREIGN PATENTS

| 334,717 | Great Britain | Sept. 11, 1930 |
| 638,787 | Germany | Nov. 23, 1936 |